May 8, 1951 J. KRUITHOF 2,551,610
PROTECTION OF THREE-PHASE MOTORS
Filed July 23, 1947
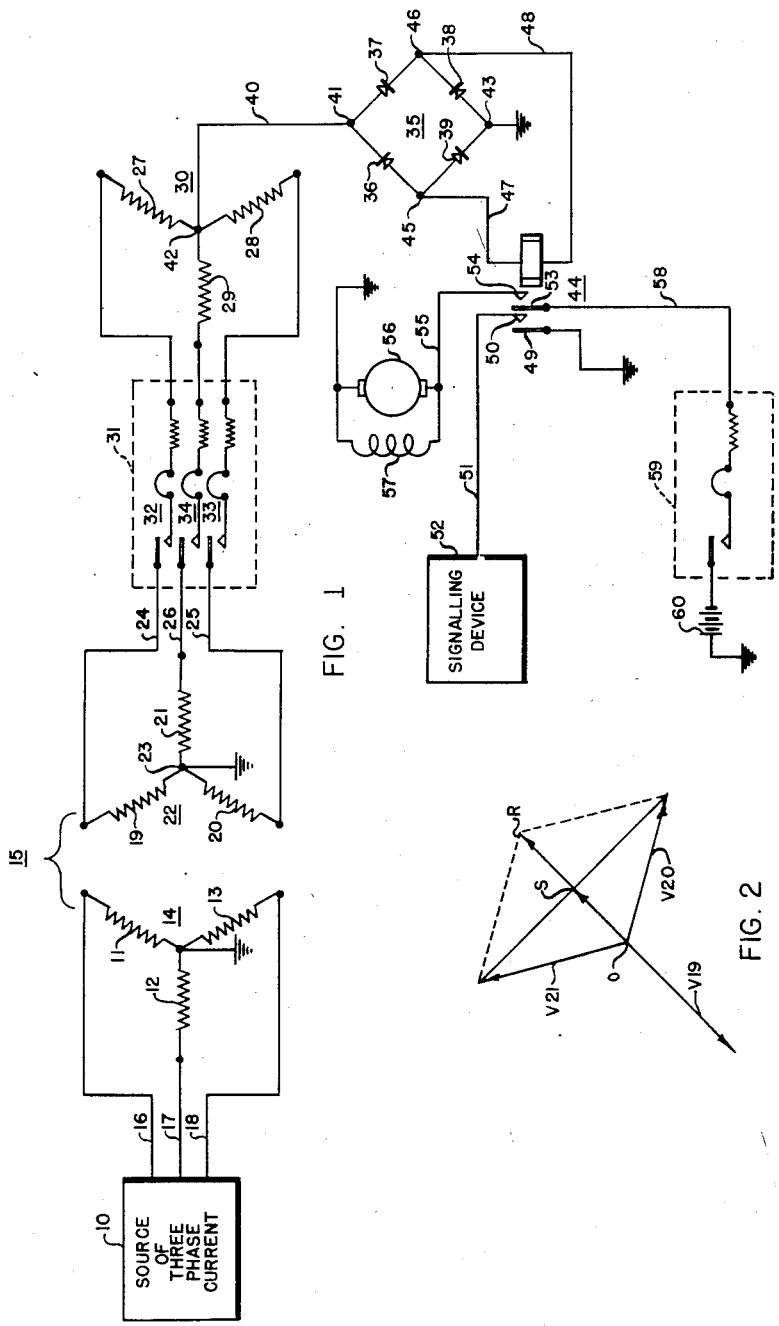
INVENTOR
JAKOB KRUITHOF
BY
*Robert Harding Jr.*
ATTORNEY Patented May 8, 1951

2,551,610

UNITED STATES PATENT OFFICE 2,551,610

PROTECTION OF THREE-PHASE MOTORS

Jakob Kruithof, Antwerp, Belgium, assignor to International Standard Electric Corporation, New York, N. Y., a corporation of Delaware Application July 23, 1947, Serial No. 763,029
In the Netherlands August 14, 1942

Section 1, Public Law 690, August 8, 1946
Patent expires August 14, 1962

2 Claims. (Cl. 318—102)

This invention relates to the operation of polyphase asynchronous motors and more particularly to a method for signaling the phase failure of any electrical phase contributing to the operation of that motor.

In the operation of polyphase asynchronous motors it is desirable that means be provided in the system associated with the motor to indicate the interruption in the supplying of power by any of the several supply leads or the interruption of or phase failure of any of the electrical phases concerned with the operation of the motor.

It is well known that such an asynchronous motor continues to run at a reduced speed if only one of its operating phases is interrupted. This reduced speed may not vary beyond certain fixed limits but such a condition nevertheless results in serious harm to the system or at best in its undesirable operation. It is seen, therefore, that upon the failure or interruption of any electrical phase an alarm circuit should be operated and that it is advantageous to associate this circuit with means to automatically operate a reserve motor which takes over the load of the system formerly taken by the asynchronous motor.

One method of operating an alarm circuit for signaling the phase failure of any of the electrical phases involves the connecting of that circuit in the supply leads conveying the electrical power to the motor. This method is disadvantageous in that the presence of additional apparatus in the supply leads increases the probability of faulty or unsatisfactory operation of the motor.

The connecting of the alarm circuit in parallel with the polyphase supply leads creates a number of undesirable effects which hamper its successful operation. One of these undesirable effects presents itself when the interruption or phase failure occurs before the point where the motor is connected to its supply leads. In this case, the reduced speed of the motor, in accordance with well known principles, causes a return current to flow which may prevent the alarm circuit from producing the necessary signal to indicate the interruption or phase failure.

Accordingly, it is a principal object of this invention to provide apparatus for indicating the interruption or phase failure of any phase of a star or Y connected polyphase asynchronous motor which apparatus is connected in circuit to the center or common point of the star or Y.

It is another object of this invention to provide a circuit for indicating the interruption or phase failure of any phase of a star Y connected polyphase asynchronous motor wherein simultaneously with indicating the interruption or phase failure the circuit causes a reserve motor to automatically assume the load normally carried by the asynchronous motor.

A feature of this invention relates to the circuit operating relay which is connected across opposite apexes of a four-leg bridge connected rectifier which has one of its other apexes connected to the center of the star connected stator of the asynchronous motor and the remaining apex connected to ground.

Another feature of this invention relates to a direct current motor which is automatically operated by the operation of the relay and assumes the load formerly carried by the asynchronous motor.

A further feature of this invention relates to the star or Y connected polyphase transformer in that the center or common phase connecting point of the secondary of that transformer is grounded.

A still further feature of this invention relates to the novel organization, arrangement and interconnection of parts which cooperate to produce an improved arrangement for indicating the interruption or phase failure of any electrical phase associated with a polyphase asynchronous motor.

Other objects, features and advantages not particularly enumerated are apparent to those skilled in the art as will be evident from the following descriptions taken in connection with the accompanying drawing.

In the drawing:

Fig. 1 is a circuit diagram, partly in block form, showing the inventive concept.

Fig. 2 is a vector diagram of the phase voltages present in the asynchronous motor.

Referring more particularly to Fig. 1, a source 10 of three phase current is connected to phases 11, 12, and 13 of the primary 14 of polyphase transformer 15 by the conductors 16, 17, and 18, respectively.

Phase windings 19, 20, and 21 of secondary 22 of transformer 15 are connected in star or Y and the common or midpoint 23 grounded. Conductors 24, 25, and 26 connect the respective phase windings of secondary 23 to the corresponding phase windings 27, 28 and 29 of stator 30 of the asynchronous motor (not otherwise shown). Intermediate secondary 15 and stator 30 a suitable overload switch 31 is connected in circuit. Separate overload switch elements 32, 33, and 34 are provided and one is connected in each phase by conductors 24, 25, and 26 respectively. It suffices to state that switch 31 is of a suitable conventional type which will effect the opening of any one of the electrical phases which becomes overloaded in excess of a certain predetermined allowable amount.

Rectifier 35 is of the bridge type and comprises four rectifying elements 36, 37, 38 and 39. Conductor 40 connects apex 41 of rectifier 35 to common or centerpoint 42 of stator 30. The opposite apex 43 is connected to ground. Relay 44 is connected across the remaining and opposite apexes 45 and 46 by conductors 47 and 48 respectively. Grounded armature 49 of relay 44 cooperates with contact 50 connected over conductor 51 to the signaling device 52. Device 52 is any suitable type visual or aural indicating device which will be operated when armature 49 and contact 50 are in engagement. This device may comprise only an ordinary electric lamp.

Armature 53 of relay 44 cooperates with contact 54. Conductor 55 connects contact 54 to motor 56 and its shunt field winding 57. The other side of winding 57 and motor 56 are grounded. Armature 53 is connected by conductor 58 to a suitable overload switch 59 which is connected at its other terminal to one terminal of battery 60 which has its other terminal grounded.

When the asynchronous motor is properly operating centerpoint 23 of secondary 22 and centerpoint 42 of stator 30 are at substantially the same potential and there is no unbalance in rectifier 35 to effect operation of relay 44.

If phase winding 19 of secondary 15 becomes overloaded and switch 32 operates the voltage vectors $V_{20}$ and $V_{21}$ shown in Fig. 2 and originating at O represent the voltage across phase windings 20 and 21, respectively. The resultant voltage of these two voltages is represented by the vector OR. If the asynchronous motor is now stopped the potential difference between centerpoint 23 of secondary 22 and centerpoint 42 of stator 30 is equal to one half the resultant operating voltage represented by vector OR and is represented by the voltage vector OS.

When the asynchronous motor is properly operating the voltage across each of the phase windings is of equal value and are 120° out of phase with each other as shown by the vectors $V_{19}$, $V_{20}$, and $V_{21}$. When the motor is properly operating the difference of potential between the points 23 and 42 of the secondary 22 and stator 30 respectively is proportional to the slip of that motor. The resulting current flowing through conductors 47 and 48 is insufficient to operate relay 44.

When operation is abnormal, e. g. when switch 31 operates, there is sufficient current through conductors 47 and 48 to operate relay 44. The operation of this relay causes armatures 49 and 53 to engage contacts 50 and 54 respectively. The engagement of armature 49 and contact 50 causes an electrical circuit to be completed through the signaling device and that device operates, thereby affording a visual or aural indication, as the case may be, of the phase failure. The engagement of armature 53 and contact 54 closes a circuit from ground through motor 56, conductor 55, contact 54, armature 53, conductor 58, overload switch 59, battery 60 and back to ground. The completion of this circuit causes motor 56 to begin operation and through a suitable mechanical arrangement it assumes the load normally carried by the asynchronous motor associated with stator 30.

The automatic operation of motor 56 in case of a phase failure thus provides for continuous operation. In many cases this is a matter of utmost importance. One example of such a case is the operation of the shafting driving the automatic telephone equipment. In addition to the means of this invention for effecting automatic operation of motor 56 in case of phase failure means may be provided to effect its automatic operation in case of a failure of the alternating current supply.

While there has been here described a preferred embodiment of this invention, it is understood that various changes and modifications may be made therein without departing from the spirit of the invention or the scope of the appended claims.

What is claimed as new and desired to be secured by Letters Patent of the United States, is:

1. Apparatus of the character described including a source of polyphase alternating current, a polyphase transformer connected to said source and having its secondary grounded, a polyphase asynchronous motor connected to said secondary, overload switches connected in each electrical phase intermediate said transformer and said motor, a bridge type rectifier having one apex of its input side connected to the stator of said motor and the opposite apex connected to ground, and means responsive to the current output of said rectifier for automatically operating a reserve motor.

2. Apparatus for signaling the interruption of any phase of a Y connected asynchronous motor system including a source of three phase current connected to a Y connected transformer having the common phase connecting point of its secondary connected to ground, a three phase asynchronous motor having its Y connected stator connected to the secondary of said transformer through an overload switch, a bridge type rectifier intermediate ground and the common phase connecting point of said stator, a relay controlling a contact connected across said rectifier, and a direct current motor in circuit with said contact.

JAKOB KRUITHOF.

REFERENCES CITED

The following references are of record in the file of this patent:

UNITED STATES PATENTS

| Number | Name | Date |
| --- | --- | --- |
| 1,270,894 | Steinmetz | July 2, 1918 |
| 1,580,848 | Newman | Apr. 13, 1926 |
| 1,601,934 | Welch | Oct. 5, 1926 |

FOREIGN PATENTS

| Number | Country | Date |
| --- | --- | --- |
| 380,176 | Germany | Sept. 3, 1923 |